Nov. 24, 1925.

A. D. BROCHU 1,562,616

SLEEVE EXTRACTING DEVICE

Filed Sept. 17, 1924

Inventor
Aimée D. Brochu
N. Clay Lindsey

His Attorney

Patented Nov. 24, 1925.

1,562,616

UNITED STATES PATENT OFFICE.

AIMÉE D. BROCHU, OF HARTFORD, CONNECTICUT.

SLEEVE-EXTRACTING DEVICE.

Application filed September 17, 1924. Serial No. 738,222.

*To all whom it may concern:*

Be it known that I, AIMÉE D. BROCHU, a subject of Great Britain, and a resident of Hartford, county of Hartford, State of Connecticut, have invented certain new and useful Improvements in a Sleeve-Extracting Device, of which the following is a specification.

This invention relates to a device for extracting sleeves or bushings from members in which they are positioned. Devices of this sort find particular use in extracting contractible bearing sleeves or bushings from the housings for the rear axles of automobiles, as explained hereinafter more in detail.

The object of the invention is to provide a device of this sort having various features of novelty and advantage.

A more specific aim of the invention is to provide a sleeve extracting device with an improved catch adapted to take into a hole or opening provided in the wall of the sleeve, the construction and arrangement being such that the catch will properly fit in the hole, and the catch, when extracting the sleeve, will not be damaged, nor scratch nor mutilate the interior of the housing.

A further aim of the invention is to provide a device of this sort wherein the catch may be of hardened steel and the catch is readily removable to permit repair thereof or a new catch to be substituted when the old one wears out.

A still further object of the invention is to provide a sleeve extracting device which may be employed to extract sleeves or bushings of different diameters.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustrative purposes, one embodiment which the invention may take:

Figures 1, 2, 3:
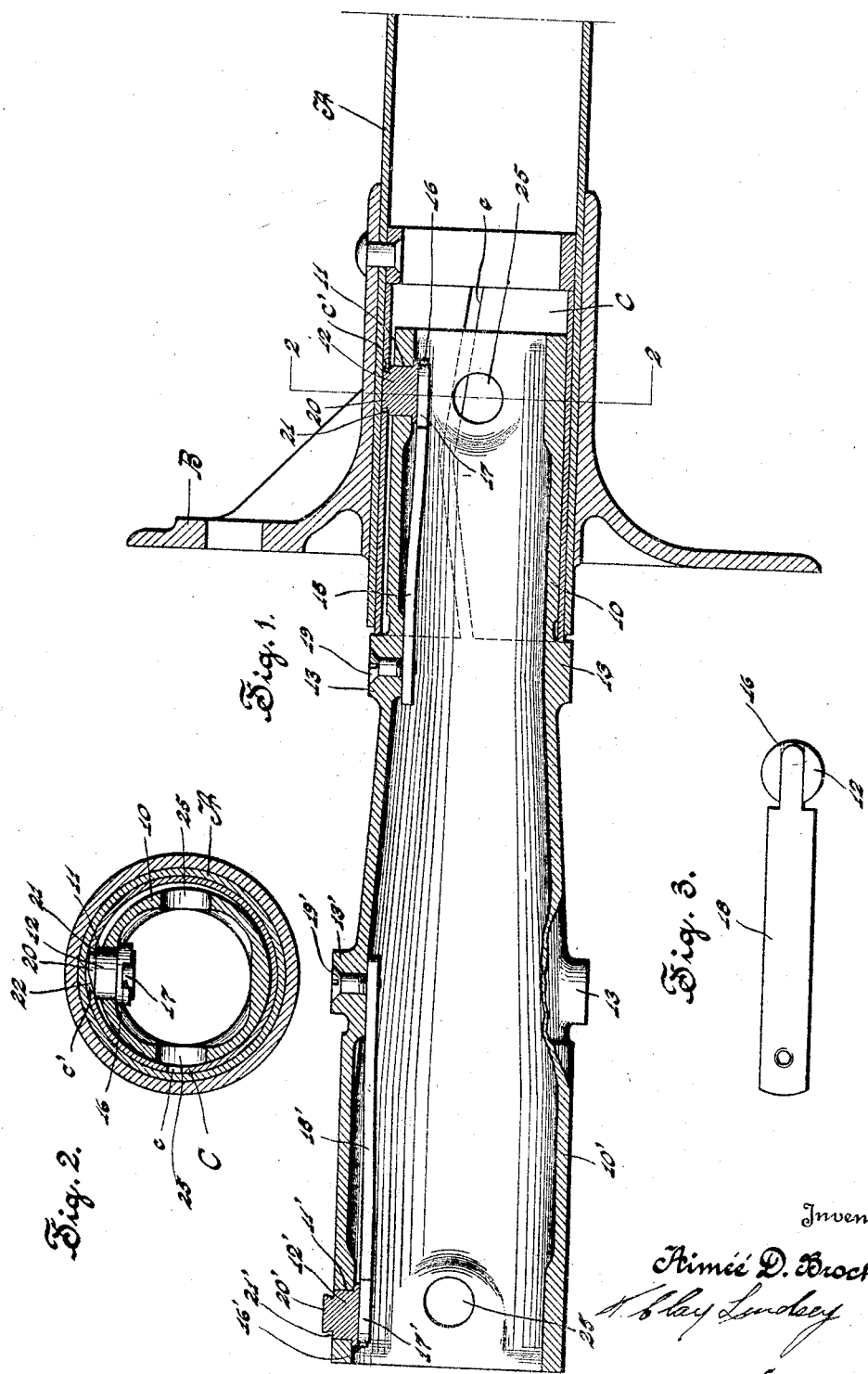
Figure 1 is a sectional view taken longitudinally through my improved device, one end of which is shown as being positioned in and engaged with a bearing sleeve of a Ford automobile.
Fig. 2 is a sectional view taken on line 2—2 of Fig. 1.
Fig. 3 is a detail view showing the connection between the spring and the inner end of the catch.

Referring to the drawings in detail, A designates one end of the pipe-like housing for the rear or live axle of an automobile such, for example, as is employed on a Ford car; B is the usual flange secured to the housing; and C is a contractible sleeve or bushing fitting within the end of the housing and adapted to receive the roller bearings (not shown) which support the live axle (also not shown). The sleeve C is longitudinally split as at $c$ so that it may be contracted to facilitate its insertion in, and removal from, the housing. The sleeve C is provided with a hole $c'$ which is adapted to receive the catch of the extracting device. This sleeve is usually constructed by stamping or punching, from a flat sheet of metal of suitable configuration and then rolling the blank into cylindrical form.

Referring now to my improved sleeve extracting device, the same has a hollow or tubular body provided at its opposite ends with cylindrical portions 10 and 10', respectively; the portion 10' being of greater diameter than the portion 10, so that one end of the device may be employed to extract sleeves of one size, and the other end of the device may be employed to extract sleeves of another size; for example, in the present instance, the right hand end 10 of the device, referring to Fig. 1, may be employed to extract bushings or sleeves from the housings of passenger automobiles and the left hand end 10' may be employed to extract sleeves from the housings of Ford trucks. The construction of the opposite ends of the device is similar and, therefore, a description of one end is illustrative of both.

The diameter of the cylindrical portion 10 is, preferably, slightly less than the internal diameter of the sleeve C so that it may be readily inserted therein and to permit contraction of the sleeve when the device is turned. The cylindrical portion 10 has, adjacent its inner end, a radial opening 11 in which a catch 12 is mounted for radial movement. Adjacent the outer end of the cylindrical portion 10 is a shoulder or shoulders adapted to engage the outer end of the sleeve C and thereby limit inward movement of the portion 10 thereinto so that the catch may be readily engaged in the hole $c'$. In the present instance, the shoulders are provided by bosses 13, preferably cast integral with the body of the device.

This catch 12 is, preferably, made of hardened steel so that it will stand up well under the rather heavy strains to which it is subjected. The inner end of the catch is enlarged or headed to limit outward movement of the catch. The inner face of the catch is provided with a transverse groove 16 which slidably receives a tongue 17 on the free end of a spring 18. The other end of the spring is detachably connected to the body of the device as, for instance, by means of a screw or bolt 19. It will be noted that, since the spring 18 is readily removable and the catch is not fixedly secured to the spring, the catch may be hardened before it is positioned in the opening 11. Also, the catch may be readily removed and replaced when it is desired to repair or renew the same, features which are of importance as the wear and tear upon the catch is considerable upon repeated use of the device. It will further be noted that, owing to the groove and tongue connection between the catch and spring, the catch is held against rotation.

The outer end of the catch is provided with a portion 20 of a reduced diameter substantially that of the hole $c'$ in the bushing and of a height substantially equal to the thickness of the wall of the bushing. The body portion of the catch is of greater diameter than that of the opening $c'$ so that there is a shoulder 21 which engages against the inside of the bushing about the edge of the hole $c'$, thereby preventing the portion 20 from extending radially beyond the bushing and engage and rub against the housing B. This is desirable because, should the catch engage and rub against the housing, the parts would be multilated and worn. In the present instance, the sleeve is contracted when my improved device is turned clockwise. In order to permit the catch to be disengaged from the hole $c'$, the top of the portion 20 at its rear edge is bevelled or inclined, as at 22; thus, when the device is turned counterclockwise, the cam surface 22 will engage the edge of the hole $c'$, resulting in the catch being cammed inwardly. As previously stated, sleeves, such as indicated by the letter C, are formed of a flat sheet of metal rolled into cylindrical shape. When the sheet is thus rolled, the hole $c'$ will become slightly elliptical, and the transverse diameter of the inner end of the hole will be slightly less than the diameter of the outer end of the hole, which means that the walls at the opposite sides of the hole will be slightly inclined relative to the axis of the hole, as shown most clearly in Fig. 2. In order that the forward or operative edge of the portion 20 of the catch may have a substantial bearing against the edge of the hole, the portion 20 is slightly undercut so that the wall thereof is inclined similarly to the inclined edge of the hole $c'$.

The construction and operation of the catch 12' and the spring 18' associated with the cylindrical portion 10' are similar to the catch 12 and spring 18.

The device is used in the following manner: After the live axle and its roller bearings have been removed from the sleeve C, the cylindrical end 10 is inserted into the latter until the bosses engage the other end of the sleeve. The device is turned clockwise to engage the catch in the hole $c'$. Thereafter, the device is rotated clockwise to contract the sleeve, and at the same time an outward pull is exerted on the device to extract the sleeve from the housing. When it is desired to remove the device from the sleeve, this may be done by rotating the device counterclockwise. The device may be turned by means of a handle or rod (not shown) passing through openings 25 in the ends of the body.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A bearing bushing extracting device including a body provided with a cylindrical end having a radial opening, a hardened metal catch mounted for radial movement in said opening, a spring having one end detachably abutting against the inner end of said catch and holding the same against rotation, and means for removably securing the other end of said spring to said body, said spring being separable from said catch for the purposes described.

2. A bearing bushing extracting device having a body provided with a cylindrical end having a radial opening, a catch of hardened metal mounted for radial movement in said opening and having a groove in its inner end, a spring having one end slidably engaging in said groove, and means for removably securing the other end of said spring to said body.

3. A bearing bushing extracting device comprising a cylindrical body having an opening in one side, a catch mounted in said opening and having a cylindrical portion movable radially in the opening and provided with a reduced outer end portion to engage an opening in a bushing and being of a height not exceeding the thickness of the wall of the bushing, the cylindrical portion of the catch being of an exterior diameter greater than the opening in the bushing to prevent the reduced portion of the catch from protruding beyond the outer side of the bushing, said catch having a transverse slot in its inner end, and a spring mounted within the cylindrical body and having a tongue on its free end slidably engaging in the transverse slot of the catch to normally urge the catch outwardly and to hold the catch from turning in the opening of the cylindrical body.

AIMÉE D. BROCHU.